UNITED STATES PATENT OFFICE.

CHARLES CARROLL GILMAN, OF ELDORA, IOWA.

FIRE-PROOF COMPOUND.

SPECIFICATION forming part of Letters Patent No. 353,629, dated November 30, 1886.

Application filed July 18, 1884. Serial No. 138,016. (Specimens.)

*To all whom it may concern:*

Be it known that I, CHARLES CARROLL GILMAN, of Eldora, Hardin county, State of Iowa, have invented a new and useful Improvement in Fireproofing Material, of which the following is a full, true, and exact description.

The process or method of making my new material involves the use of alluvial or surface clay, preferably substantially free from sand or grit, a sufficient quantity of water, and any comminuted vegetable matter—as sawdust, for example. To the said clay, under certain circumstances, may be added, with good results, a quantity of clayey loams, or prairie-soil, or both. I use, by preference, those alluvial clays which are too impure for brick-making, for some of the impurities they contain act as a flux under low firing, and thus serve to give strength to the material. With the alluvial clay is to be mixed a comminuted vegetable matter, and of the various substances that will answer the purpose I prefer to use sawdust. If an equivalent substance is used, it should possess the property of elasticity—*i. e.*, resume its original form after being compressed, as it will be when passed under the grinders, hereinafter described. Further, the sawdust must not be too fine, else the resultant material will be more dense than desirable. The relative quantities of alluvial clay and sawdust to be mixed together will depend upon the use to which the finished material is to be applied. For partition-walls I prefer to use two parts, by measure, of said clay to three parts of the sawdust, and this will yield a finished material weighing forty-two pounds per cubic foot. For floor-arches, joists, and furring, I use three parts of said clay to two parts of sawdust, and this will yield a material weighing fifty-six pounds to the cubic foot—half the weight of building-brick. For roof-sheathing, to which shingles, slates, or tiles may be fastened with nails or otherwise, equal parts of said clay and sawdust will yield a product weighing forty-eight pounds to the cubic foot. Combustible organic substances in the clay itself will cause the above-recorded figures to vary more or less.

The alluvial clay and the sawdust are each carefully measured, and together with a sufficient quantity of water are thrown into powerful steam-driven mills. I use ponderous iron mills, known as "chasers," whose steel-shod wheels, surmounted by a heavy metal driving-gear, revolve rapidly with a reciprocating movement upon an iron bed-plate. I prefer the form of mill patented to Turner, Parks & Co., December 9, 1873, No. 145,373, which I find efficacious in making the thorough mixture which is essential. Clay and sawdust differ so greatly in specific gravity, and are so unlike in composition, that great and unusual care must be observed in grinding and mixing, so that the resultant plastic mass may be homogeneous. Without this thorough mixing and blending of the two substances a successful result cannot be reached. I find from experience that "pugging-mills" cannot properly nor profitably perform this operation, and I am therefore compelled to use the class of machines hereinbefore described. The mills are kept in operation about twenty-five minutes—a length of time usually sufficient to insure a thorough grinding and mixing of the materials, so that the resultant mass is homogeneous. The plastic mass is then removed to a press, (similar to those used for making drain-pipes,) through which it is forced by steam-pressure, and from which it issues in a continuous stream and in a compressed condition. The form in which it issues from the press, whether solid or hollow, &c., is governed by the configuration of the die through which it is forced. The dies used in these machines can be applied to and removed from the same at pleasure, can be constructed of any form desired, and are comparatively inexpensive. The plastic and compressed mass, as it issues from the press in the desired form, is cut into blocks of convenient length, which, being sufficiently firm to be handled, are at once removed to the drying-yards, where they are "hacked up" on the ground, or placed on racks to dry. After an exposure of about thirty hours in fine weather the blocks are in suitable condition to be transferred to the kilns. Any kiln will answer if a low heat is maintained. I prefer, however, the open-top kiln used by brick-makers. In fact, the said blocks may be burned in arches with bricks, as they aid materially in distributing the heat, and will "cure the cold places" or parts inaccessible to the flue-fires. Thirty-seven hours from the time the smoke-fires are lighted is usually sufficient to bring the material to a body, when the blocks will have assumed the appearance and color of a well-burned brick. Twelve hours after the kiln is closed it may be opened, cooled, and its contents removed.

The mixture of alluvial clay, sawdust, and water will, under the particular treatment hereinbefore set forth, yield at a less cost a product in some respects similar to brick, but only one-third as heavy—a product which is penetrable by nails, like wood, which can be readily sawed and worked by wood-working saws and tools, is a good fireproofing material, is an excellent non-conductor of heat and cold, requires no expensive plant for its production, and which, from economical considerations, (aside from its fireproofing and heat-non-conducting qualities,) will supplant wood, except for finishing purposes.

My process or method, briefly restated, consists in taking certain quantities of alluvial clay, sawdust, and water, and simultaneously grinding and mixing these substances together in such a manner as to make an intimate and uniform mixture—i. e., so that the mass shall be homogeneous throughout; in then at once transferring this mass, before its homogeneity can be destroyed or impaired, to a powerful press, in which it is compressed, and from which it issues in a continuous stream of the form desired; in then at once cutting the material into appropriate lengths, then partially drying the same, and finally burning in kilns, as practiced in ordinary brick-making. At this final step in the process the sawdust coacts with the firing-fuel to distribute a uniform heat throughout the mass and gradually disappears, leaving a spongy brick-like product having the characteristics and the uses hereinbefore referred to. The finished material is homogeneous in structure—i. e., it possesses in all parts the same degree of porosity. It is then sawed or worked with edged tools to the shape or form desired.

I am aware that patents have been issued on vegetable and fire-clay mixtures, burned in special kilns under a high heat, for various purposes, notably United States Reissued Patents Nos. 10,419 and 10,420, granted to me December 11, 1883, for fire-proof composition; and I am conversant with the difficulties and expense encountered in the working of fire-clays in every form; but the material which I have herein described, while for specific purposes and extraordinary resistance to fire it will not compare with that described in said patents, yet for ordinary fireproofing purposes it is sufficiently refractory to heat, and is further thoroughly effective in the construction of buildings as a protection against external heat and cold.

Having thus described my invention, what I claim is as follows:

1. The process or method of producing the material herein described, which consists in simultaneously mixing and grinding together, in suitable proportions and in powerful mills, alluvial clay, sawdust, and water, so as to produce a homogeneous plastic mass, then subjecting this mass to the action of a press, then dividing the same into blocks or pieces of suitable length, then partially drying, and finally burning the same in a kiln by the combined action of external heat and the combustion of the imprisoned sawdust, substantially as described.

2. The process or method of producing the material herein described, which consists in simultaneously mixing and grinding together, in suitable proportions and in powerful mills, sawdust, water, and alluvial clay substantially free from sand or grit, so as to produce a homogeneous plastic mass, then subjecting this mass to the action of a press, then dividing the same into blocks or pieces of suitable length, then partially drying, and finally burning the same in a kiln by the combined action of external heat and the combustion of the imprisoned sawdust, substantially as described.

3. The process or method of producing the material herein described in finished form or condition, which consists in simultaneously mixing and grinding together, in suitable proportions and in powerful mills, sawdust, water, and alluvial clay substantially free from sand or grit, so as to produce a homogeneous plastic mass, then subjecting this mass to the action of a press, then dividing the same into blocks or pieces of suitable length, then partially drying by atmospheric influences, then burning in a kiln, substantially as described, and finally sawing or working the same with edged tools to the form required, substantially as set forth.

4. The new material or product hereinbefore described, which consists of kiln-burned alluvial clay having the porosity and homogeneity substantially as described.

5. The new material or product hereinbefore described, which consists of kiln-burned alluvial clay substantially free from sand or grit and possessing the porosity and homogeneity substantially as described.

CHARLES CARROLL GILMAN.

Witnesses:
GEO. H. EVANS,
WM. A. POLLOCK.